United States Patent
Drugge et al.

(10) Patent No.: US 8,599,772 B2
(45) Date of Patent: Dec. 3, 2013

(54) MULTICARRIER RADIO RECEIVER AND METHOD FOR RECEIVING MULTIPLE CARRIERS

(75) Inventors: Oskar Drugge, Lund (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 610 days.

(21) Appl. No.: 12/794,421

(22) Filed: Jun. 4, 2010

(65) Prior Publication Data

US 2011/0002283 A1 Jan. 6, 2011

Related U.S. Application Data

(60) Provisional application No. 61/223,167, filed on Jul. 6, 2009.

(51) Int. Cl.
*H04W 4/00* (2009.01)

(52) U.S. Cl.
USPC .......................................... 370/329; 370/342

(58) Field of Classification Search
None
See application file for complete search history.

(56) References Cited

U.S. PATENT DOCUMENTS

| | | | | |
|---|---|---|---|---|
| 6,870,824 B1 * | 3/2005 | Kim et al. | ...................... | 370/342 |
| 2004/0114555 A1 * | 6/2004 | Hayashi et al. | ................ | 370/329 |
| 2008/0298319 A1 * | 12/2008 | Lee et al. | ...................... | 370/330 |

OTHER PUBLICATIONS

Qualcomm Europe; "Searcher Impact to DC-HSDPA Type 3i UEs when SCH is absent on secondary carrier"; Jun. 29, 2009; 3GPP TSG-RAN WG4 Meeting; pp. 1-6.*
Notification of Transmittal of the International Search Report and the Written Opinion of the International Searching Authority, or the Declaration issued for PCT Application No. PCT/EP2010/058966, dated Apr. 1, 2011.
International Search Report issued for PCT Application No. PCT/EP2010/058966, dated Apr. 1, 2011.
Written Opinion of the International Searching Authority issued for PCT Application No. PCT/EP2010/058966, dated Apr. 1, 2011.
Qualcomm Europe: "Searcher Impact to DC-HSDPA Type 3i UEs when SCH is Absent on Secondary Carrier," R1-092622; Jun. 24, 2009; XP050351116; pp. 1-5.
3GPP TSG-RAN WG4 Meeting #51bis, R4-092283, Jun. 29, 2009-Jul. 2, 2009.
3GPP TS 25.214 V8.6.0 (Release 8) (May 2009).
European Office Action mailed Aug. 21, 2013 in European Application No. EP 10 729 702.0.
HSPA AD-HOC Chairman (Ericsson): "HSPA Ad-hoc Summary", 3GPP Draft; R1-092973 HSPA Ad-hoc, $3^{rd}$ Generation Partnership Project (3GPP), vol. RAN WG1, Jul. 7, 2009, XP050597592.

* cited by examiner

*Primary Examiner* — Hassan Phillips
*Assistant Examiner* — Mark A Mais
(74) *Attorney, Agent, or Firm* — Nixon & Vanderhye P.C.

(57) ABSTRACT

A radio receiver uses a first receiver type for receiving data and/or control information on one or more secondary carrier channel(s) if one or more common channels(s) are transmitted on the corresponding secondary carrier. Otherwise, the radio receiver uses a second receiver type for receiving data and/or control information on one or more secondary carrier channel(s).

31 Claims, 4 Drawing Sheets

MULTICARRIER RADIO RECEIVER AND METHOD FOR RECEIVING MULTIPLE CARRIERS

RELATED APPLICATION

This application claims priority from U.S. provisional patent application Ser. No. 61/223,167, entitled "Method and Arrangement in a Telecommunications System," filed on Jul. 6, 2009, the contents of which are incorporated herein by reference.

TECHNICAL FIELD

The technical field relates to radio communications systems, and more particularly, to multi-carrier receivers.

BACKGROUND

In response to the increased need for higher bit rate and more efficient transmission of packet data over cellular networks, the WCDMA 3GPP Release 5 extended the WCDMA specification with the High Speed Downlink Packet Access (HSDPA), and Release 6 introduced Enhanced Dedicated Channel (E-DCH), often referred as Enhanced Uplink (EUL) or High Speed Uplink Packet Access (HSUPA). HSDPA and HSUPA together are called High Speed Packet Access (HSPA) which greatly improves the achievable bit rate over the air interface. 3GPP Release 7 introduced higher-order modulation and multiple input multiple output (MIMO) for HSDPA to further improve the achievable bit rate.

Similarly, a primary objective of a multi-carrier (MC) system is to achieve high data rate. A multi-carrier arrangement with frequency division duplex (FDD) can be described as a set of downlink carriers linked to a set of uplink carriers. The downlink carriers can be adjacent or non-adjacent in the frequency domain, and the same holds for the uplink carriers. Multi-carrier arrangements can also be used in time division duplex (TDD) systems. The component carriers in a multi-carrier system may also belong to different frequency bands. As one example, WCDMA/HSPA operating on multiple 5 MHz carrier frequencies is referred to as Multi-Carrier WCDMA or Multi-Carrier HSPA. In an E-UTRAN system, multiple component carriers such as four 20 MHz carriers in the downlink and two 20 MHz in the uplink (for FDD) can be used to enhance the data rate. So a multi-carrier system uses more than one carrier in the downlink and/or the uplink. One of the multi-carriers is called the primary or anchor carrier and the remaining one(s) is(are) called secondary or supplementary carriers.

The anchor carrier contains all physical channels including all common control channels. The secondary carriers may or may not contain all physical channels; for instance, they may lack some of the common downlink control channels. The anchor carrier in the downlink and in the uplink (i.e., if there is more than one carrier in uplink) should support legacy operation based on a single carrier, which means the downlink anchor carrier should contain all common channels so that the legacy single-carrier UEs are served. A multi-carrier UE also needs the anchor carrier to transmit all common control channels for acquisition of the frame timing, neighbor cell measurements, etc. Any single-carrier system can be evolved to a multi-carrier system to increase data rate. The future advancements of HSPA, E-UTRAN, and other systems will likely result in multiple carriers both in the uplink and the downlink, (e.g., 4 downlink carriers and 2 uplink carriers).

Different types of receivers exist. Some can receive multi-carrier transmissions—others cannot. Some receivers have interference cancellation capability—some do not. Even for those that do have interference cancellation capability, there are differences in those capabilities. For example, one type of receiver might be able to specifically cancel inter-cell interference, while another type of receiver cannot. The inter-cell interference is contributed by the signals transmitted from the neighboring cells.

In multi-carrier systems, although the anchor/primary carrier contains all the common channels, depending upon the network implementation, some of the common control channels may not be transmitted on the secondary carriers. The absence of a common control channel, like a synchronization channel, on the secondary carrier increases the complexity of the inter-cell interference cancellation in the receiver. Assume, for example, that a multi-carrier UE with an inter-cell interference cancellation receiver in a WCDMA type system is unable to use such a secondary synchronization channel (S-SCH) to identify the scrambling code group for an interfering neighbor cell. In order for the UE receiver to cancel inter-cell interference caused by interfering neighbor cells, the channel impulse responses of the interfering signals from each of the interfering cells must be determined. To perform this determination, the UE needs information about the master timing in each of the neighbor cells and the scrambling codes used in those neighbor cells. In the absence of synchronization signals on secondary carriers, the UE will have to extensively search to determine the scrambling codes used in the neighbor cells which drains UE power and slows down the synchronization process.

One approach to this problem might be to predefine that in multi-carrier systems, the UE enables the inter-cell interference cancellation only on the primary anchor carrier but not on the secondary carriers. But this approach leads to reduced performance on the secondary carrier because only non inter-cell interference cancellation receiver configurations may be used on the secondary carrier. If there are multiple secondary carriers, the performance loss will be higher.

Another approach is to signal the list of scrambling codes used on neighbor cells on the secondary carriers via some sort of signaling, e.g., RRC signaling. But this increases the signaling overhead and is difficult to include in legacy terminals and legacy versions of a specification like 3GPP. Furthermore, the neighbor cell measurements are made on cells belonging to the anchor carrier, which means that the signaling of an additional neighbor cell list for cells belonging to a second carrier would only be to assist inter-cell interference cancellation receiver operation on the secondary carrier. This extra network planning work to obtain a neighbor cell list solely for the inter-cell interference receiver may not be justified, and it would be preferable to avoid this extra work.

In summary, the network implementation determines whether all or a sub-set of common channels (e.g., SCH) are sent on the secondary carriers in a multi-carrier system. It is preferable that UEs perform inter-cell interference cancellation if possible, but in the absence of receiving the SCH on a secondary carrier, it is more demanding for the UE to perform inter-cell interference cancellation, and therefore, not necessarily desirable. On the other hand, if the SCH is available on a secondary carrier, then inter-cell interference cancellation can be performed at least with less complexity, power, and delay.

SUMMARY

What is needed and described herein is technology that permits flexibility in receiver configurations so that an appropriate receiver configuration is used based on the availability of one or more common channels on a secondary carrier.

The technology in this application relates to radio communications that include multiple radio frequency (RF) carriers including a primary carrier and a secondary carrier. A radio node, e.g., a mobile radio terminal, a base station, etc., can receive multiple RF carriers and includes a first radio receiver configuration and a second radio receiver configuration. The radio node includes electronic circuitry that is configured to select a first radio receiver configuration to receive channel information on the secondary carrier if a common channel in the cell is transmitted on the secondary carrier. If the common channel is not transmitted on the secondary carrier, the radio node selects the second radio receiver configuration to receive the first channel information on the secondary carrier. The technology may be applied to receiving multiple secondary carriers.

The radio node may use information received on the primary carrier to determine whether the common channel is transmitted on the secondary carrier. In one non-limiting example embodiment, the radio node determines whether the common channel is transmitted on the secondary carrier by performing a cell search on the secondary carrier. In another non-limiting example embodiment, the radio node determines whether the common channel is transmitted on the secondary carrier using timing and channel power information associated with the serving cell on the primary carrier. The timing may include slot and frame timing for the primary carrier, and the channel power information may include an estimated common channel power delay profile on the primary carrier. If the common channel is a synchronization channel, then the determination of whether the common channel is transmitted on the secondary carrier may be made by correlating the secondary carrier with one or more synchronization codes using the timing acquired for the primary carrier in each cell. It is assumed that the primary and secondary carriers are time aligned, i.e., their transmit timings in each base station are the same or almost the same. The time alignment error requirement is typically pre-defined. For example in case of DC-HSDPA, which comprises of two downlink adjacent carriers, the transmit timing difference between the two carriers is required to be within ¼ Tc according to TS 25.104, where Tc is the duration of 1 WCDMA chip (1 Tc≈260 ns).

In one example implementation, the first radio receiver configuration is one in which a radio receiver cancels inter-cell interference, and wherein the second radio receiver configuration is one in which a radio receiver does not cancel inter-cell interference. The radio receiver in the first radio receiver configuration and the second radio receiver configuration cancels intra-cell interference. The intra-cell interference is contributed by the signals transmitted from the serving cell and noise.

Accordingly, the first radio receiver configuration may be more complex than the second radio receiver configuration since the former is required to process and cancel both inter-cell and intra-cell interferences.

In a non-limiting example application for a WCDMA system, the first receiver configuration is a type 3i radio receiver configuration, the second receiver configuration is a type 3 radio receiver configuration, the first channel is an HS-PD-SCH, and the common channel includes a primary synchronization channel and a secondary synchronization channel. The UE receiver performance requirements corresponding to type 3i radio receiver configuration are specified as the enhanced performance requirements type 3i in 3GPP specification TS 25.101, "User Equipment (UE) radio transmission and reception (FDD)." The UE receiver performance requirements corresponding to type 3 radio receiver configuration are specified as the enhanced performance requirements type 3 in 3GPP specification TS 25.101. Other examples of the second receiver configuration are a type 2 and type 1 radio receiver configurations whose receiver performance requirements are also specified in TS 25.101. In an example application for an LTE system, the first channel is a channel carrying user data such as a physical downlink shared channel (PDSCH) or a channel carrying control information as a physical downlink control channel (PDCCH). However, the first channel may be any channel is received by the UE.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

The technology may be used in any type of cellular radio communications. For ease of description, the term mobile radio terminal encompasses any kind of radio communications terminal/device like user equipment (UE), PDAs, cell phones, laptops, etc. The technology described in this application may be used any radio communications system where multiple carriers are supported at least in one direction. One non-limiting example is a WCDMA network which communicates with one or more user equipments (UEs) over a Uu air interface. Typically, one or more core networks communicate with radio network controllers (RNCs) in the WCDMA network over an Iu interface. A WCDMA radio access network (RAN) may also be called Universal Mobile Telecommunications System (UMTS) Terrestrial Radio Access Network (UTRAN). The WCDMA RAN handles all tasks that relate to radio access control such as radio resource management and handover control. The core network connects the access network to one or more external networks (PSTN, Internet, etc.). The user equipment is connected to one or more radio base stations (Node Bs) over the WCDMA air interface. One or more base stations are coupled to an RNC over an Iub interface, and RNCs communicate over an Iur interface.

Figure 1:
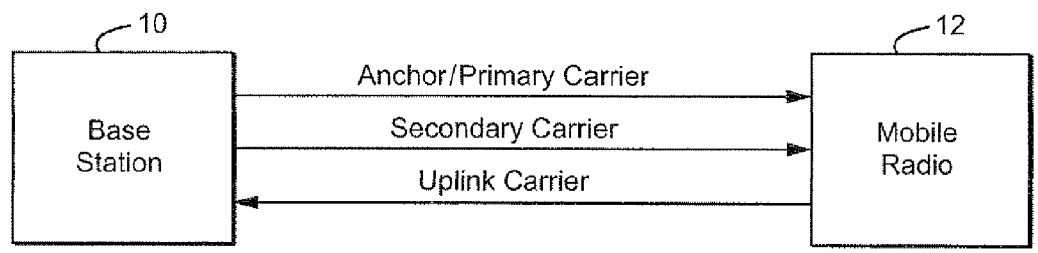
FIG. 1 illustrates an example multi-carrier communications system.

FIG. 1 illustrates an example multi-carrier communications system with a base station 10 communicating over an air interface with a mobile radio terminal 12 (a UE) using multiple carriers. In this example, the base station transmits an anchor or primary carrier and a secondary carrier, and the mobile radio 12 transmits a single uplink carrier. It should be understood that the mobile radio 12 is a multi-carrier radio in the sense that it can at least receive multiple carriers, but it also might be able to transmit using multiple carriers. While the examples below assume that the primary and secondary carriers are transmitted in the downlink from the base station 10 to the mobile radio 12, the technology also applies in the uplink direction for multi-carrier transmitting mobile radios, where the base station is the receiver and the mobile the transmitter.

In a non-limiting WDCMA example of FIG. 1, a UE in a dual cell-HSDPA (DC-HSDPA) operation, which is specified in 3GPP TS 25.214 release 8, is able to simultaneously receive HSDPA traffic over two downlink carrier frequencies transmitted in the same frequency band from a single serving base station sector. One uplink carrier for a DC-HSDPA UE is not tied to one of the two downlink carriers. In DC-HSDPA UE, the anchor carrier has all the physical channels including F-DPCH, E-RICH, E-AGCH, and E-RGCH. During dual carrier operation in CELL_DCH mode of operation, one of the downlink carriers is the secondary carrier and one is primary or anchor carrier.

Figure 2:
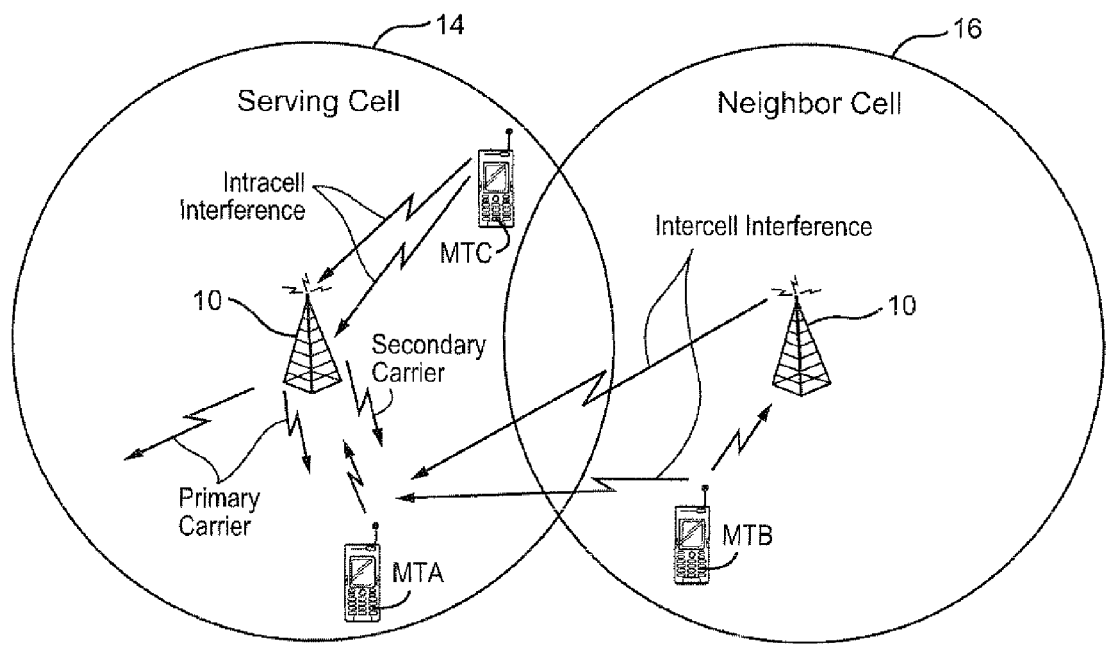
FIG. 2 illustrates an example multi-carrier cellular communications system showing intra-cell and inter-cell interference.

FIG. 2 illustrates an example multi-carrier cellular communications system showing intra-cell and inter-cell interference. The serving cell 14 includes a base station 10 that transmits to mobile terminals MTA and MTC in its cell over primary and secondary carriers. A neighboring cell 16 also includes a base station 10 that transmits information which is received by mobile terminal MTB but which also may interfere with the radio communications in the serving cell 14—inter-cell interference. Transmissions from terminal MTB in the neighbor cell 16 may also be a source of inter-cell interference. Uplink transmissions from the mobile terminals in the serving cell 14 are a source of intra-cell interference.

Figure 3:
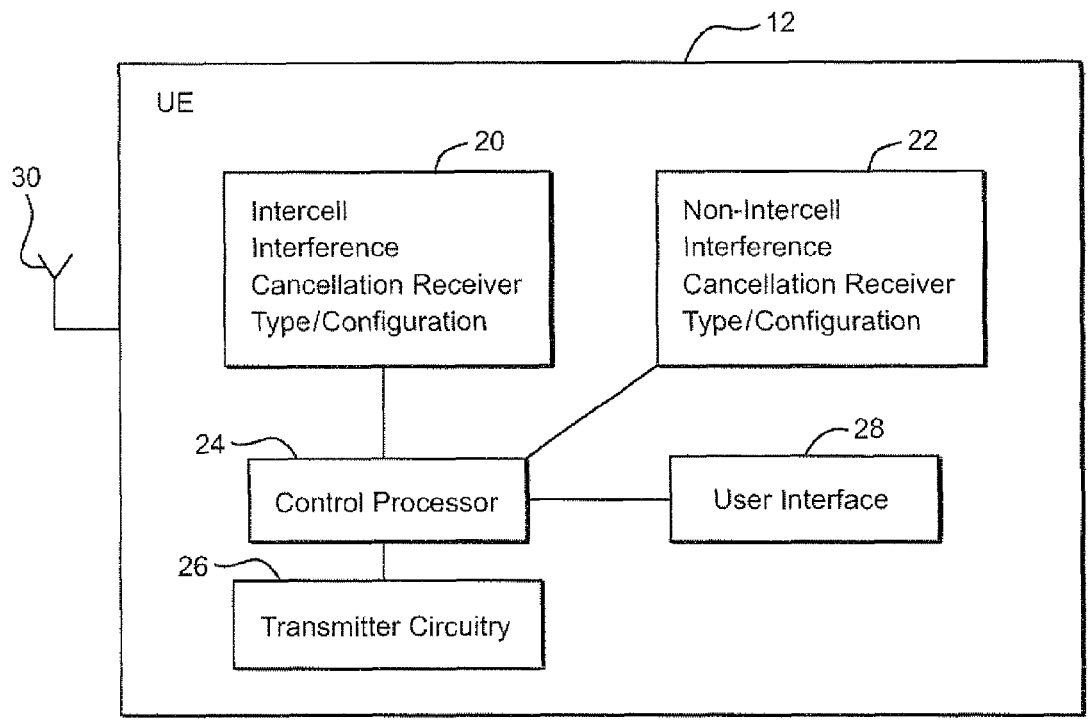
FIG. 3 is a function block diagram illustrating a non-limiting example multi-carrier radio terminal with different types of interference cancellation capabilities.
Figure 4:
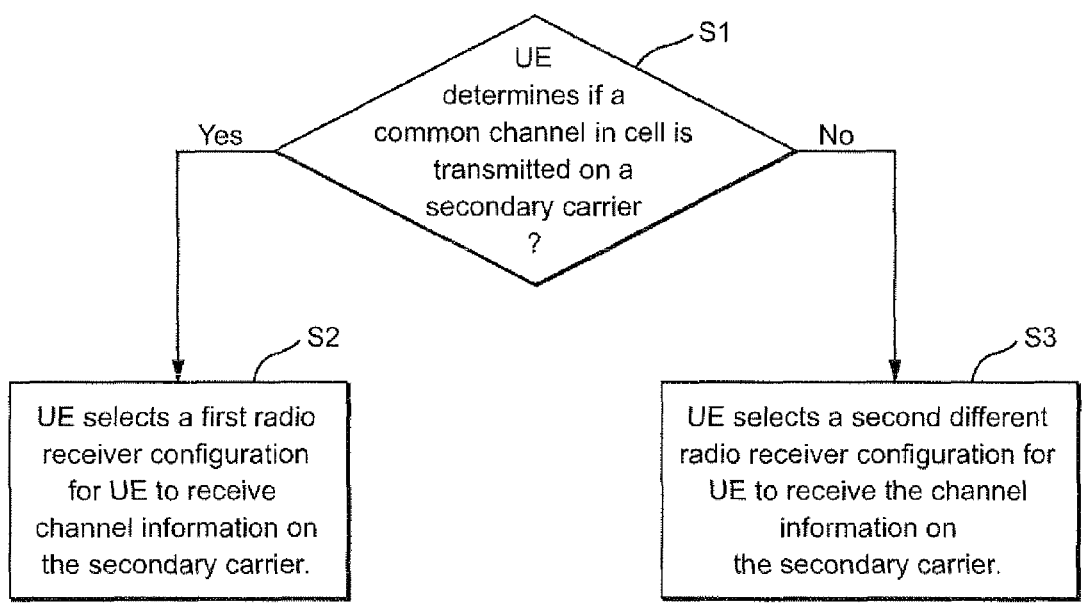
FIG. 4 is a flow chart illustrating non-limiting example procedures for selecting a first or second radio receiver configuration to receive channel information on a secondary channel.

FIG. 3 is a function block diagram illustrating a non-limiting example multi-carrier radio terminal UE 12 with different types of interference cancellation capabilities. The UE 12 includes one or more antennas 30 for receiving and transmitting radio signals with another radio station like a base station in the example. A control processor 24 controls the overall operation of the UE 12 and is connected to user interface circuitry 28, transmitter circuitry 26, and receiving circuitry 20 and 22. The control processor 24 dynamically or semi-statically selects which type of receiver or receiver configuration will be used to receive signals from a particular transmitting station. Block 20 shows an inter-cell interference cancellation receiver type/configuration, and block 22 shows an intra-cell interference cancellation receiver type/configuration. More generally, the receiving circuitry may include a more sophisticated and complex receiver type/configuration and a less sophisticated and complex receiver type/configuration. The receiving circuitry 20 and 22 can be implemented in one receiver, e.g., as two different receiver configurations, or in two or more receivers. One example way of implementing different receiver configurations in one receiver is to use a DSP with different coding depending on the receiver type/configuration selected or desired.

For illustration purposes, different receiver configurations are now described in a WCDMA context. The 3GPP WCDMA release 5 UE receiver performance requirements are based solely on the baseline classical rake receiver, commonly specified as the minimum performance requirements in TS 25.101. In 3GPP WCDMA release 6 and beyond, enhanced UE receiver performance requirements are also specified in TS 25.101. In order to fulfill these enhanced requirements, the UE must implement an advanced receiver, e.g., with receiver diversity, a chip level equalizer, and generalized rake receivers (G-RAKE) or similar receiver structures. These enhancements boost the achievable downlink bit rate. In WCDMA terminology, UE receiver performance requirements for various advanced receivers are specified as enhanced receiver type 1 (receiver diversity), enhanced receiver type 2 (chip level equalizer), enhanced receiver type 3 (combined receiver diversity and equalizer), and type 3i (combined receiver diversity and inter-cell interference cancellation receiver). The enhanced receiver performance specification does not preclude UE vendors from implementing advanced receivers beyond the specified enhanced requirements. Enhanced performance requirements are not confined to HSDPA in WCDMA. Enhanced requirements also exist for example for a number of reception scenarios: DCH, MBMS, E-DCH downlink channels etc. To simplify the description, the focus in this description is on a multi-carrier HSDPA reception scenario. But that focus is not limiting on the broad ranging application of the technology.

As mentioned in the background, different types of radio receivers have different levels of performance gain achieved by eliminating or at least mitigating different types of interference. There are various sources and forms of interference e.g. intra-cell, inter-cell, inter-stream interferences etc. For instance, in a CDMA system like WCDMA, intra-cell interference is common due to lack of orthogonality between the channelization codes as they pass through a multipath fading channel. On the other hand, inter-cell interference exists in single or tight reuse systems such as in CDMA and OFDMA-based LTE system and is generated typically from a number of neighbor cells. Moreover, MIMO transmission uses two or more streams of data to achieve higher SINR. But multi-stream transmission also leads to inter-stream interference, which can be eliminated or considerably reduced by using an appropriate receiver.

The enhanced receiver type 3 (a.k.a G-RAKE 2 receiver in a symbol-level implementation) can eliminate intra-cell interference to attain a significant performance gain over the classical rake receiver. The enhanced receiver type 3i (a.k.a G-RAKE 2+ receiver in a symbol-level implementation) can eliminate both intra-cell and inter-cell interferences to attain significant performance gain over the classical rake receiver. There are several different ways to implement the type 3i receiver functionality. Two methods are referred to as parametric and non-parametric solutions. A non-parametric solution estimates the net interference effect, bundling intra-cell and inter-cell interference into one package, and tries to reduce them simultaneously. A parametric solution, on the other hand, attempts to model, the interference into its different contributing parts. The parametric solution must detect a certain number of interfering cells to suppress (ideally the strongest interfering cells). For instance, the UE in a WCDMA system could identify the scrambling codes used in the strongest interfering cells and use this information to eliminate or minimize the interference. The UE further needs to dynamically estimate the channel response of the interfering cell(s) in order to suppress the interference. Estimating the channel response can be done in several ways, where one example way is to separately estimate the power delay profile (PDP) and use it to determine the channel tap delays and separately estimate the complex weight for each of the tap delays.

Although the above discussion has been in the context of a 3GPP specified Type 3i (Parametric) receiver configuration, the knowledge of the channel responses from interfering cells could be used in many other receiver structures/configurations. Non-limiting examples of other receiver configurations include receivers that attempt to create a replica of the received interfering signal and subtract it from the desired signal.

The following sets the stage for a non-limiting example UE implementation related to synchronization and identification of scrambling codes. In single carrier WCDMA/HSPA, the downlink common control channels include a primary synchronization channel (P-SCH) which carries a primary synchronization code (PSC), a secondary synchronization channel (S-SCH), which carries a secondary synchronization code (SSC), a primary common pilot channel CPICH which carries scrambling code information, and a broadcast channel (BCH) which carries system information including a master information block (MIB) and one or more system information blocks (SIB). The P-SCH and S-SCH together are known as the SCH channel. LTE also uses common channels similar to those used in UTRAN/WCDMA/HSPA. Common channels in LTE include primary synchronization signals (PSS), secondary synchronization signals (SSS), reference signals (equivalent to pilot signals on the CPICH), and broadcast channel. The broadcast channel is split into physical broadcast channel (PBCH), which carries the MIB, and PDSCH, which carries SIBs.

In single carrier WCDMA, the P-SCH and S-SCH enable the UE to determine the slot and frame timing, as well as identify a limited set of primary scrambling codes containing the specific primary scrambling codes used by the cell from which the P-SCH and S-SCH are transmitted. The limited set is called the scrambling code group. The CPICH is used to pinpoint which of the primary scrambling codes contained in the scrambling code group indicated by P-SCH and S-SCH that is used by the cell being identified which indicates one of the 512 possible physical cell identities. There are a total of 8192 scrambling codes available for the system to use. This set is divided into 64 primary scrambling code groups, each group containing 8 primary scrambling codes. Each primary scrambling code is associated with 15 secondary scrambling codes through a one-to-one mapping. The UE does not need to search for secondary scrambling codes during the initial synchronization procedure. In the single carrier situation, the identification of slot/frame boundary and identification of scrambling code for the serving cell may be done through a staged approach. Stage 1: find the slot boundary using the P-SCH. Stage 2: find the frame boundary and the scrambling code group using P-SCH and S-SCH, where each scrambling code group contains 8 primary scrambling codes. Stage 3: using CPICH, determine the best primary scrambling code candidate out of the 8 contained in the scrambling code group identified in Stage 2.

As described in the background, in order for the UE receiver to cancel the inter-cell interference, which is caused by the neighbor cells, the channel impulse responses from each of the interfering cells must be determined. For the UE to do this in a WCDMA system, the UE needs to know about the timing of the neighbor cells and the scrambling codes used in those neighbor cells. In a multi-carrier WCDMA system, the anchor carrier contains all the common channels. However, depending upon the system implementation, some of the common control channels may not be transmitted on the secondary carriers; it might for example be the case that only the CPICH is transmitted on the secondary carrier to assist the UE for the demodulation of data received from the secondary carrier. The absence of SCH channels on the secondary carrier increases the complexity of the inter-cell interference cancellation receiver because the UE cannot make use of the P-SCH and S-SCH to identify the slot timing, frame timing and scrambling code group.

In the absence of synchronization signals on secondary carriers, the UE must perform extensive searching (over all 8192 scrambling codes in this non-limiting example) and many delay hypothesizes to determine the scrambling codes used in the neighbor cells. This will drain UE power, slow down the synch process, and lead to worse performance due to delayed processing.

One way to determine if there are synchronization signals on the secondary carriers is to perform a typical cell search procedure on the secondary carriers for all neighboring cells. The UE scans for the SCH channel using a correlator on many different timings/delays on the secondary carrier(s). The SCH channel is detected on the secondary carrier only when the correlator generates an output that exceeds a predetermined threshold. But this cell search approach requires a significant amount of processing resources to correlate all delays for all scrambling codes.

Figure 5:
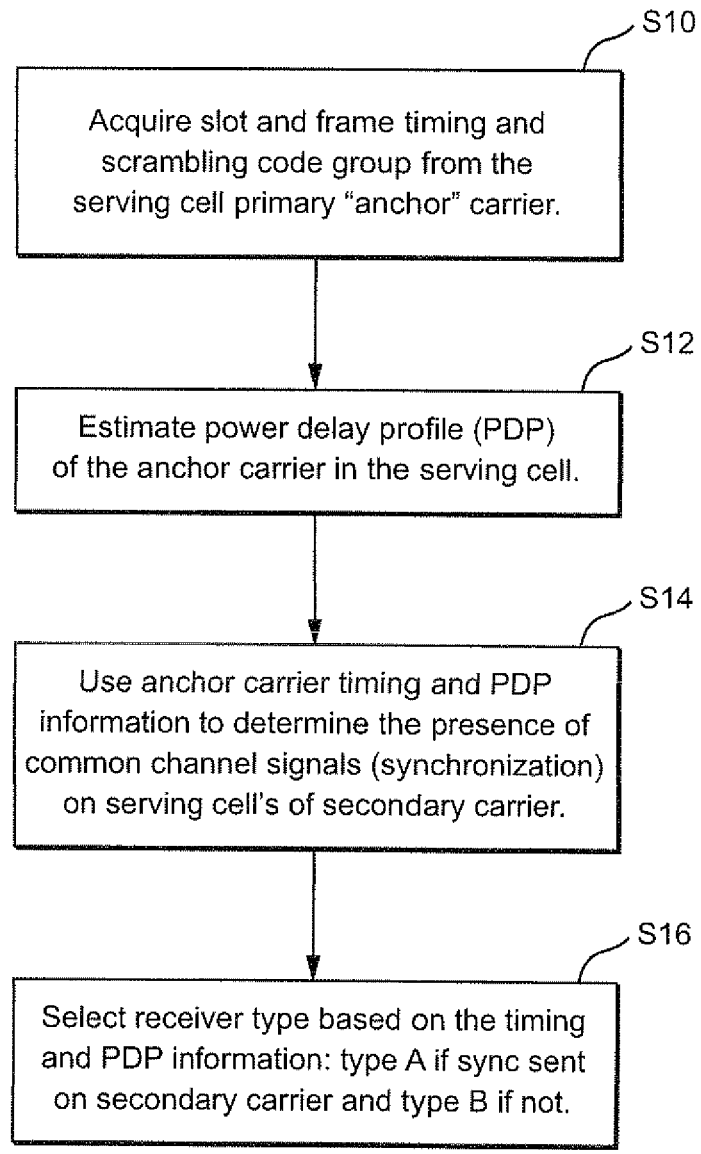
FIG. 5 is a flow chart illustrating example procedures in accordance with a specific but non-limiting implementation for selecting a first or second radio receiver configuration to receive channel information on a secondary channel.

An alternative non-limiting example approach that uses less processing resources is now described in conjunction with the flowchart in FIG. 5. A multi-carrier capable UE receives data from the serving cell on the anchor carrier and the serving cell on at least one secondary carrier. The UE determines the slot and frame timing and scrambling code group of the serving cell on the anchor carrier from the P-SCH, S-SCH, and CPICH channels respectively (step S10). The UE also determines the power delay profile of the serving cell on the anchor carrier from the CPICH channel (step S12). The specific details for determining the slot and frame timing and the channel power delay profile are known to those skilled in the art and not repeated here to simplify the description. The UE uses the timing and power delay profile of the serving cell on the anchor carrier to search for the presence of common channel signals (e.g., the SCH signals) on the serving cell's the secondary carrier (step S14). In a multi-carrier system, the cells on the anchor and secondary carriers in the same base station have the same frame timing. Moreover, it can also be assumed that the anchor and secondary carriers are either co-located, (i.e., in co-located or co-sited base stations), or located in the same base station and thus will be perceived by the UE as having the same received timing and channel power delay profile. Due to practical constraints, there may be a small misalignment between the frame timing of the primary and secondary carriers, e.g., in the order of less than a WCDMA chip. In DC-HSDPA, the frame time alignment error between the primary and the secondary carrier is ¼ Tc (Tc=WCDMA chip duration; 1 Tc≈260 ns). The search for the SCH for example on the serving cell belonging to the secondary carrier may be performed by correlating over all possible PSC codes or by using any suitable approach based on the prior knowledge of the power delay profile on the anchor (or primary) carrier.

If the UE determines that the common channel signals (e.g., the SCH signals) are transmitted on the serving cell on the secondary carrier, then the UE enables a more advanced receiver type/configuration, labeled here as receiver type A, for receiving data and/or signaling on the secondary carrier (step S16). Receiver type A can for example attempt to cancel inter-cell interference. As mentioned above, the complexity of an inter-cell interference cancelling receiver is greatly reduced when the SCH is present on the secondary carrier because the UE can make use of the SCH to perform a traditional cell search on the secondary carrier to identify the strongest interfering cell(s). Otherwise, if the SCH is not found on the secondary carrier, then the UE enables a less advanced receiver type/configuration, labeled receiver type B. For instance, the receiver type B can either be based on receiver diversity and/or based on an equalizer that cancels only intra-cell interference.

More generally, the UE dynamically or semi-dynamically adapts or enables an appropriate receiver type/configuration for reception on a secondary carrier in a multi-carrier system depending upon whether a common channel is transmitted, e.g., whether a SCH is transmitted. Information regarding whether the common channel (e.g., SCH) is present on the secondary carrier can be acquired by the UE by various mechanisms. For instance, the UE may be signaled by the network or via a pre-defined rule as to whether the synchronization signals are transmitted on the secondary carriers or not.

An example of a receiver type A which has more advanced capabilities than receiver type B is an enhanced receiver type 3i described above which can significantly cancel inter-cell interference from certain number of strongest neighbor cells. It may also cancel intra-cell interference. An example of a receiver type B is enhanced receiver type 3 described above which is a relatively less complex receiver and may not substantially cancel inter-cell interference from the neighbor cells. However, it may still be capable of cancelling intra-cell interference.

Figure 6:
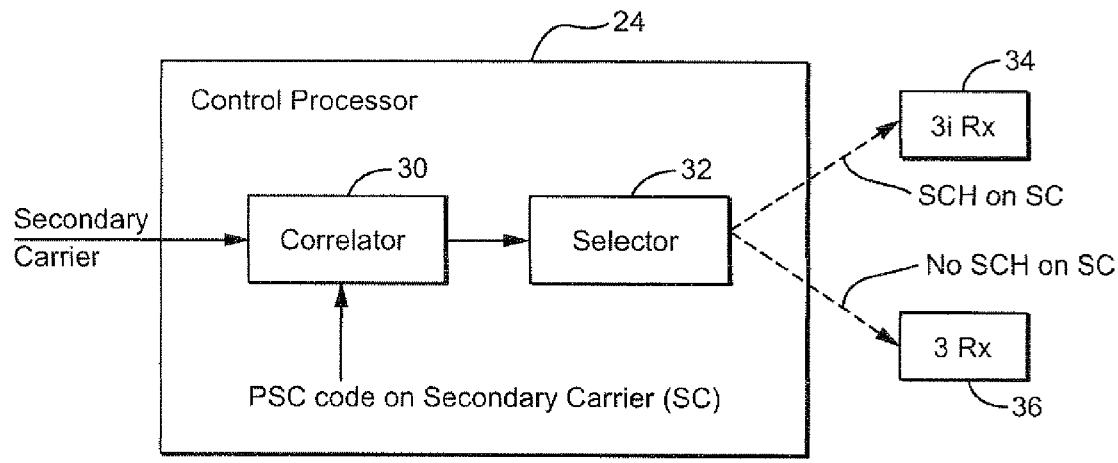
FIG. 6 is function block diagram illustrating an example control processor for a non-limiting example implementation.

FIG. 6 is function block diagram illustrating an example control processor 24 for a non-limiting example implementation based on the cell search approach described above. The control processor 24 includes a correlator 30 for correlating a received secondary carrier with a PSC code for a secondary carrier. The output of the correlator 30 is compared to a threshold by a selector 32, and if a correlator output exceeds the threshold indicating detection of the SCH on the secondary carrier, the selector 32 selects the 3i receiver type/configuration 34. Otherwise, the selector 32 selects the less sophisticated 3 receiver type/configuration 36.

Figure 7:
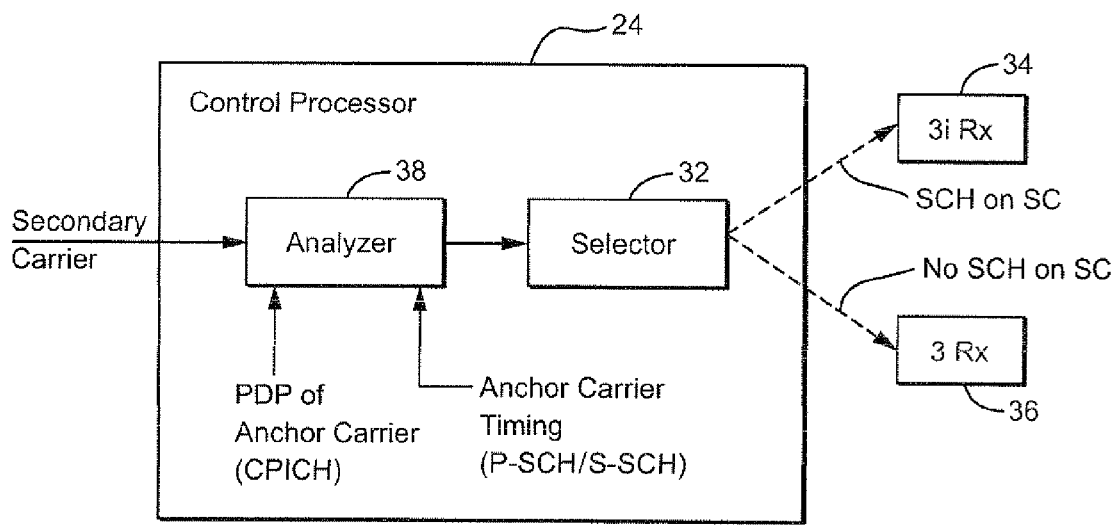
FIG. 7 is function block diagram illustrating a different example control processor for the non-limiting example implementation in FIG. 6.

FIG. 7 is function block diagram illustrating a different example control processor for the approach described above in FIG. 5. The control processor 24 includes an analyzer 38 for analyzing a received secondary carrier with respect to the PDP of the anchor carrier determined using the CPICH and the determined anchor carrier timing information as described above for FIG. 5. The output of the analyzer 38 is used by a selector 32 to selects the 3i receiver type/configuration 34 if the SCH is detected on the secondary carrier. Otherwise, the selector 32 selects the less sophisticated 3 receiver type/configuration 36.

As previously mentioned, the technology described above is applicable to any multi-carrier system with any number of carriers. For example, a multi-carrier system might have 4 downlink carriers with 3 carriers being secondary ones. The UE can use the technology to independently adapt the receiver type/configuration for each of the secondary carriers. Of course, the technology is not limited to the types of receivers specifically described.

In summary, the technology allows a radio receiver to use a first receiver type for receiving data and/or control information on one or more secondary carrier channel(s) if one or more common channel(s) are transmitted on the corresponding secondary carrier. Otherwise, the radio receiver uses a second receiver type for receiving data and/or control information on one or more secondary carrier channel(s).

One non-limiting specific example application to a DC-HSDPA operation is as follows. The UE uses an enhanced receiver type 3i (inter-cell interference cancellation receiver with receiver diversity, e.g., G-RAKE2+) for receiving HS-PDSCH from a secondary carrier if SCH channels or signals (primary and secondary synchronization signals) are transmitted on the corresponding secondary carrier. Otherwise, the UE uses an enhanced receiver type 3 (non inter-cell interference cancellation receiver with receiver diversity, e.g., G-RAKE2) for receiving HS-PDSCH from the said secondary carrier. This can be extended for other channels like the HS-SCCH in HSDPA and applied to other channels like PDSCH or PDCCH channels used in E-UTRAN or LTE systems.

Dynamically switching between receiver types for receiving on the secondary carriers depending upon whether the secondary carrier contains common channel information like synchronization signals offers many benefits. Examples include:

A—System throughput increase on the average e.g. inter-cell interference is carried out when all common channels are transmitted.

B—No requirement for extra signaling overheads

C—No requirement for network planning to create neighbor cell list for the inter-cell interference cancellation operation.

D—More power efficient UE implementations.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for receiving multiple radio frequency (RF) carriers including a primary carrier and a secondary carrier, comprising:

a radio node, capable of receiving multiple RF carriers and having a first radio receiver configuration and a second radio receiver configuration, and selecting a first radio receiver configuration to receive first channel information on the secondary carrier if a common channel in the cell is transmitted on the secondary carrier and selecting the second radio receiver configuration to receive and adapt the reception of the first channel information on the secondary carrier if the common channel is not transmitted on the secondary carrier.

2. The method in claim 1, further comprising:
the radio node using information received on the primary carrier to determine whether the common channel is transmitted on the secondary carrier.

3. The method in claim 1, wherein the radio node determines whether the common channel is transmitted on the secondary carrier by performing a cell search on the secondary carrier.

4. The method in claim 1, wherein the radio node determines whether the common channel is transmitted on the secondary carrier based on explicit signaling or information transmitted by the serving cell on the primary carrier.

5. The method in claim 1, wherein the radio node determines whether the common channel is transmitted on the secondary carrier using timing and channel power information associated with the serving cell on the primary carrier.

6. The method in claim 5, wherein the channel power information includes an estimated common channel power delay profile on the primary carrier.

7. The method in claim 1, further comprising: determining whether the common channel is transmitted on the secondary carrier by correlating the secondary carrier with one or more synchronization codes.

8. The method in claim 1, wherein the common channel is a synchronization channel.

9. The method in claim 1, wherein the first radio receiver configuration is one in which a radio receiver cancels inter-cell interference, and wherein the second radio receiver configuration is one in which a radio receiver does not cancel intercell interference.

10. The method in claim 9, wherein the radio receiver in both the first radio receiver configuration and the second radio receiver configuration cancels intra-cell interference.

11. The method in claim 1, wherein the first radio receiver configuration is more complex and involves more processing than the second radio receiver configuration.

12. The method in claim 1 applies to receiving multiple secondary carriers.

13. The method in claim 1 in a WCDMA system, wherein the radio node is a mobile radio terminal, the first receiver configuration is a type 3i radio receiver configuration, the second receiver configuration is a type 3 radio receiver configuration, the first channel is an high speed-physical downlink shared channel (HS-PDSCH) and/or high speed-signaling control channel (HS-SCCH), and the common channel includes a primary synchronization channel and a secondary synchronization channel.

14. The method in claim 1 in an LTE system wherein the first channel is a physical downlink shared channel (PDSCH) and/or a physical downlink control channel (PDCCH).

15. The method in claim 1, wherein the first channel is a packet data shared channel and/or control channel.

16. Apparatus for use in a radio node to receive multiple radio frequency (RF) carriers including a primary carrier and a secondary carrier, comprising:

receiver circuitry configured to receive multiple RF carriers and having a first radio receiver configuration and a second radio receiver configuration; and
electronic circuitry configured to select the first radio receiver configuration to receive first channel information on the secondary carrier if a common channel in the cell is transmitted on the secondary carrier,
wherein the electronic circuitry is configured to select the second radio receiver configuration to receive and adapt the reception of the first channel information on the secondary carrier if the common channel is determined not to be transmitted on the secondary carrier.

17. The apparatus in claim 16, wherein the electronic circuitry is configured to determine whether the common channel is transmitted on the secondary carrier by performing a cell search on the secondary carrier.

18. The apparatus in claim 16, wherein the electronic circuitry is configured to use information received on the primary carrier to determine whether the common channel is transmitted on the secondary carrier.

19. The apparatus in claim 18, wherein the electronic circuitry is configured to determine whether the common channel is transmitted on the secondary carrier using timing and channel power information associated with the serving cell on the primary carrier.

20. The apparatus in claim 19, wherein the channel power information includes an estimated common channel power delay profile on the primary carrier.

21. The apparatus in claim 16, wherein the radio node determines whether the common channel is transmitted on the secondary carrier based on explicit signaling or information transmitted by the serving cell on the primary carrier.

22. The apparatus in claim 16, wherein the electronic circuitry includes a correlator configured to correlate the secondary carrier with one or more synchronization codes.

23. The apparatus in claim 16, wherein the common channel is a synchronization channel.

24. The apparatus in claim 16, wherein the first radio receiver configuration is one in which a radio receiver cancels inter-cell interference, and wherein the second radio receiver configuration is one in which a radio receiver does not cancel intercell interference.

25. The apparatus in claim 16, wherein the radio receiver in both the first radio receiver configuration and the second radio receiver configuration is configured to cancel intra-cell interference.

26. The apparatus in claim 16, wherein the first radio receiver configuration is more complex and involves more processing than the second radio receiver configuration.

27. The apparatus in claim 16 in a WCDMA system, wherein the radio node is a mobile radio terminal, the first receiver configuration is a type 3i radio receiver configuration, the second receiver configuration is a type 3 radio receiver configuration, the channel is an high speed-physical downlink shared channel (HS-PDSCH) and/or high speed-signaling control channel (HS-SCCH), and the common channel includes a primary synchronization channel and a secondary synchronization channel.

28. The apparatus in claim 16 in an LTE system wherein the first channel is a physical downlink shared channel (PDSCH) and/or a physical downlink control channel (PDCCH).

29. The apparatus in claim 16, wherein the radio node is a mobile radio terminal.

30. The apparatus in claim 16, wherein the radio node is a base station.

31. The apparatus in claim 16, wherein the first channel is a packet data shared channel and/or control channel (HS-SCCH).

* * * * *

UNITED STATES PATENT AND TRADEMARK OFFICE
CERTIFICATE OF CORRECTION

PATENT NO. : 8,599,772 B2
APPLICATION NO. : 12/794421
DATED : December 3, 2013
INVENTOR(S) : Drugge et al.

It is certified that error appears in the above-identified patent and that said Letters Patent is hereby corrected as shown below:

In the Specification

In Column 4, Line 12, delete "channel is received" and insert -- channel received --, therefor.

In Column 5, Line 40, delete "E-RICH," and insert -- E-HICH, --, therefor.

In Column 7, Line 2, delete "model, the" and insert -- model the --, therefor.

In the Claims

In Column 11, Line 65, in Claim 16, delete "Apparatus" and insert -- An apparatus --, therefor.

Signed and Sealed this
Eighth Day of July, 2014

Michelle K. Lee
*Deputy Director of the United States Patent and Trademark Office*